United States Patent Office 2,859,104
Patented Nov. 4, 1958

2,859,104
ETHYLENEDIAMINE DERIVATIVES AND PREPARATION

Harry Kroll, Edgewood, R. I., assignor to Geigy Chemical Corporation, a corporation of Delaware No Drawing. Application October 2, 1952
Serial No. 312,855

14 Claims. (Cl. 71—1)

This invention concerns N,N-dihydroxyethyl N',N'-dicarboxymethyl ethylenediamine, its preparation, its water-soluble salts with monovalent cations (i. e. monovalent metals as well as radicals that can be monovalent cations), and also its water-soluble chelate complexes with divalent and higher than divalent metals, and the preparation of these salts and complexes. Also involved are compositions, comprising certain of the chelate complexes commingled with other ingredients, for use in industrial applications.

The water-soluble salts of N,N-dihydroxyethyl N',N'-dicarboxymethyl ethylenediamine embraced by the invention are those of the monovalent metals as well as those formed with monovalent cationic radicals. Presently particularly useful are the water-soluble salts with the alkali-type cations. Among these latter are its salts with an alkali metal as sodium, potassium, lithium, caesium, as well as those with the nitrogen-containing or ammonia-derived cations, for example, its ammonium salts and its salts with amines, such as with an alkanolamine as mono-, di-, or triethanolamine or -propanolamine, or other such alkanolamine particularly lower alkanolamine, or with an alkylamine such as mono-, di-, or trimethylamine or -ethylamine, or other such lower alkylamine.

A monovalently substituted salt is formed when the hydrogen of only one carboxyl group of this dihydroxyethyl dicarboxymethyl ethylenediamine is replaced by a monovalent metal or other monovalent cation such as any of the ammonia-derived cations exemplified above. A divalently substituted salt results when the hydrogen of each of the carboxyl groups of this ethylene diamine derivative is replaced by one or another such monovalent metal or other monovalent cation.

The water-soluble chelate complexes of this dihydroxyethyl dicarboxymethyl ethylenediamine are those formed with any of the polyvalent metals, namely, the divalent or higher than divalent metals. Embraced among these chelate complexes are those of divalent metals such as the alkaline earth metals, such as barium, calcium, strontium, with magnesium included among them, and the iron group metals iron, nickel, and cobalt, and others such as copper, zinc, and manganese, as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher.

In a chelate complex with a divalent metal, or the divalent state of a metal that has two or more valence states, the hydrogen of each of the carboxyl groups of this ethylenediamine derivative is replaced by a valence bond of the divalent or higher valent metal. Thus dihydroxyethyl dicarboxymethyl ethylenediamine also forms further complexes with the higher valence states of the various polyvalent metals having at least two valence states as well as with other higher than divalent metals.

N,N-dihydroxyethyl N',N'-dicarboxymethyl ethylenediamine can be used in aqueous solutions to prevent the precipitation of the hydroxides of di-, tri- and tetravalent metal ions, for it is an advantageously effective complexing agent for such metals as calcium, magnesium, copper, zinc, manganese, iron (especially ferric), nickel, and cobalt, and other metals, in such solutions. The salts of this ethylenediamine with the alkali-type cations, such as its alkali metal salts and ammonia-derived salts, are also useful as sequestering agents as well as for making chelate complexes with the various metal cations indicated as forming complexes with this ethylene diamine derivative, and for making other compounds. These salts with the alkali-type cations are water-soluble. So also are the chelate complexes with iron and the various other metals referred to above.

The iron chelate complex, particularly with ferric iron, is especially useful in agriculture, for example, to supplement deficiencies, or unbalanced proportions to other metals, of this element in the soil, as in the treatment of trees suffering from iron chlorosis. As with the iron chelate complexes, others of the metal chelate complexes can likewise be incorporated in fertilizers to be applied to the soil, or dissolved in aqueous solution to be sprayed on the foliage, similarly to overcome an unbalanced relative proportion to other metals of the respective one of so-called minor metals that trees and plants derive from the soil. Some of the chelate complexes of this diamine with metals of those that are found in the blood stream of humans or other animals, such as the calcium, magnesium, zinc, iron, copper, and manganese complexes, can be given by oral administration to overcome deficiencies of such trace elements in humans and other animals. This dihydroxyethyl dicarboxymethyl ethylene diamine (in its free acid form), and in many instances its salts with the alkali-type cations, can be used in electroplating, and other treating, baths that contain metal ions of metals that would precipitate under the operating conditions, to prevent the precipitation of such metals, for example, to prevent the precipitation of ferric iron. The free acid, its indicated salts, and various complexes can also be employed to influence the regular even and smooth deposition of the metal being deposited.

The preparation of N,N-dihydroxyethyl N',N'-dicarboxymethyl ethylenediamine from aminoethyl dihydroxyethylamine is illustrated by, but not restricted to, the following examples:

Example 1.—By reaction with sodium chloracetate.—To a solution of one mol of aminoethyl dihydroxyethyl amine in 200 milliliters of water is added slowly two mols of sodium chloracetate. During the addition the temperature of the reaction mixture is maintained between 50–70° C. and its pH is held between 9.5 and 10 by dropwise addition of an aqueous 15% sodium hydroxide solution, to the extent of a total addition of two mols of sodium hydroxide. After completion of the addition of the alkali, the reaction mixture is kept at 70° C. for two hours.

The reaction mixture is then acidified with sulfuric acid to pH 4.5, and the solution evaporated to dryness over a water-bath. The dry residue is then extracted with boiling methyl alcohol, and filtered, and the alcohol filtrate concentrated to a small volume. On cooling the thus concentrated filtrate, the N,N-dihydroxyethyl N',N'-dicarboxymethyl ethylenediamine separates out as a crystalline solid.

Example 2.—By reaction with glycolonitrile and excess alkali (a new method for carboxymethylation).—A mixture of 45.7 grams (0.308 mol) dihydroxyethyl ethylenediamine, 200 grams of water, and 123 grams of barium hydroxide octahydrate (0.387 mol) were placed in a 500 milliliters round bottomed flask and heated to refluxing temperature at subatmospheric pressure of 3–4 inches. Then 55.2 grams (0.68 mol) of a 70% aqueous solution of glycolonitrile were added dropwise through a dropping funnel as rapidly as the released ammonia was driven off, over a period of 3 to 4 hours. After all the ammonia was boiled off, the mixture was held at its refluxing temperature for a half hour longer. Then the amount of barium ion present was precipitated completely by addition of the calculated sufficient amount of 50% sulfuric acid to the hot reaction mixture, necessary to precipitate all of the barium as sulfate and leave no excess of sulfuric acid. The barium sulfate was then filtered off and the filter cake of it washed thoroughly with hot water. The combined filtrates were then decolorized with Darco S–51 and, after filtering off the decolorizing charcoal, were evaporated under reduced pressure to a thick syrup. The latter was triturated with ethanol until the N,N-dihydroxyethyl N',N'-dicarboxymethyl ethylenediamine crystallized out. The crystals were filtered off and amounted to 50 grams of product (72.5% yield) and of tan color (as it still contained some inorganic impurity). Titration showed it to be 85% pure. The product was then recrystallized three times from water-methanol solutions containing one part of methanol to from one to three parts of water. The product was then recrystallized from water. The final product titrated to a neutral equivalent of 265 (theoretical molecular weight is 264) and melted at 190° C. This ethylene diamine derivative is water-soluble and so also are its various salts and chelate complexes of the type referred to above.

The N,N-dihydroxyethyl N',N'-dicarboxymethyl ethylenediamine seems to combine with ferric iron in a 1:1 ratio or 2:1, depending on the pH. Thus, at pH 5 one mol of ferric iron will combine with one mol of this compound, and at pH 9 one mol of ferric iron will combine with two mols of the compound. It is a much better sequestering agent for iron than ethylenediamine tetra-acetic acid which keeps only 0.6 mol of iron in solution at pH 5. In addition, the N,N-dihydroxyethyl N',N'-dicarboxymethyl ethylenediamine chelate complexes with calcium, with nickel, and with zinc are exceptionally stable. They show a tendency toward incorporating hydroxyl ion into the complex.

The various water-soluble salts and chelate complexes of this ethylenediamine derivative can be prepared as illustrated in, but not restricted to, the following examples:

*Example 3.—Its ammonium salt:* (a) *In aqueous medium.*—One mol of the N,N-dihydroxyethyl N',N'-dicarboxymethyl ethylenediamine is dissolved in just enough water to take it into solution and sufficient standard concentrated ammonium hydroxide solution is added with stirring until one mol of ammonia is thus added. On carefully evaporating the solution to dryness, the desired ammonium salt it obtained.

(b) *In liquid ammonia.*—A quantity of the N,N-dihydroxyethyl N',N'-dicarboxymethyl ethylenediamine is dissolved in an amount of liquid ammonia greater than that required to form the ammonium salt, and the excess is allowed to evaporate off.

The corresponding salts with the other nitrogen-containing or ammonia-derived cations are similarly obtained by replacing in the foregoing procedure (a) the quantity of ammonium hydroxide containing the one mol of ammonia by the corresponding required amount of an aqueous solution of the respective alkanolamine or alkylamine of the type described above. Alternatively, the free dihydroxyethyl dicarboxymethyl ethylenediamine can be dissolved in a sufficient quantity of the liquid amine itself.

*Example 4.—The alkali metal salts.*—The corresponding alkali metal salts can be obtained likewise by the method of Example 3 by replacing the ammonium hydroxide solution by the required amount of a convenient concentration of an aqueous solution of the respective alkali metal hydroxide such as sodium hydroxide or potassium hydroxide or that of any other alkali metal.

Alternatively, the barium hydroxide of Example 2 can be replaced by the equivalent amount of sodium hydroxide, or other alkali metal hydroxide, and the reaction solution evaporated carefully to dryness after being held at the refluxing temperature for the half hour following the boiling off of the ammonia (that is, omitting the addition of the sulphuric acid). However, if the solution before evaporation appears off color, the step of decolorizing with Darco S-61 can be included. Yield exceeds 90%.

*Example 5.—The alkaline earth metal chelate complexes.*—The various alkaline earth metal chelate complexes can be prepared by the same method described for the alkali metal salts, following the procedure of Example 3, by replacing the quantity of ammonium hydroxide solution used to obtain the ammonium salt by an amount of a convenient concentration of aqueous suspension of the respective alkaline earth hydroxide to combine with both carboxyl groups of the diamine.

Alternatively, the barium salt can be obtained by omitting from Example 2 the step of adding the sulfuric acid used there to precipitate the barium sulfate. The other alkaline earth chelate complexes can also be obtained by this alternative method by replacing the barium hydroxide in Example 2 by the corresponding equivalent amount of the hydroxide of any other alkaline earth metal, for example, calcium hydroxide or magnesium hydroxide.

*Example 6.—The iron chelate complexes:* (a) *The ferric complex.*—To a concentrated solution containing one mol of N,N-dihydroxyethyl N',N'-dicarboxymethyl ethylenediamine is added a concentrated solution containing one mol of a water-soluble ferric salt, for example, the chloride, nitrate, sulfate, or acetate, and the solution cautiously evaporated until the ferric chelate complex is obtained. Before the evaporation is started, it is helpful to adjust the pH, if necessary, to 5 by addition of the required amount of the acid corresponding to the anion of the ferric salt used.

(b) Since ferric iron combines with two mols of this diamine at pH 9, the corresponding chelate complex is obtained by mixing a concentrated aqueous solution containing two mols of the alkali cation salt, for example, its alkali metal salt, such as its sodium salt, with an aqueous solution of a water-soluble ferric salt (1 mol) of the type just above described, adjusting the pH, if necessary, to 9, by the addition of the required amount of the alkali corresponding to the cation of the diamine, and evaporating the reaction solution to separate the ferric iron chelate complex by fractional crystallization. The ferric chelate complex appears from olive drab to russet (i. e. high red with much brown) in color. The ferrous iron chelate complex can be similarly obtained.

The corresponding chelate complexes of any other metals, for example, the water-soluble chelate complexes of zinc, nickel, copper, cobalt, and manganese, are similarly obtained. The nickel chelate complex is greenish blue in color, the cobalt complex is pink, the manganese complex is a light brown, and the other salts and chelate complexes are light in color or substantially colorless.

As already mentioned, these various metal chelate complexes can be used to treat trees and plants to supply to them various trace metals ordinarily found in them and in one or more of which they show a deficiency due, for instance, to a disturbance in the balance of the necessary relative proportions of the availability of these minerals in the soil. Thus, for example, an iron chelate complex of this dihydroxyethyl dicarboxymethyl ethylenediamine is useful, by inclusion in the fertilizer or in a spray or drench, to treat trees, such as citrus trees, suffering from iron chlorosis. The ferric iron chelate complex of N,N-dihydroxyethyl N',N'-dicarboxymethyl ethylenediamine is admirably effective in treating citrus trees suffering from iron chlorosis. This chelate complex has been successful in overcoming iron chlorosis found in citrus plants growing in the calcareous soils found in Florida. On the other hand, the corresponding ferric iron chelate complex of ethylenediamine tetra-acetic acid is ineffective to overcome iron chlorosis in such plants growing in such soil.

The metal chelate complexes of this dihydroxyethyl dicarboxymethyl ethylenediamine thus applicable in agriculture are not limited to the iron chelate complex. The corresponding metal chelate complex of any of the other trace metals found in trees and plants, for example, the zinc and the manganese chelate complex, are similarly effective.

Accordingly, a significant part of the invention embraces compositions effective in agriculture to supply to trees and plants at least one trace metal ordinarily found in them. These compositions comprise at least one chelate complex of N,N-dihydroxyethyl N',N'-dicarboxymethyl ethylenediamine of a metal commonly found as a trace metal in trees and plants dispersed in a vehicle harmless to such plant. The metal chelate complex can be intermixed with a solid carrier to provide a composition to be applied on top of the soil surrounding the plant, such as a suitable fertilizer, or with an inert carrier such as sand to give a composition that can be applied either on top of the soil or worked into it. On the other hand, the metal chelate complex can be dissolved in a liquid vehicle, advantageously as an aqueous solution that can be applied as a spray to the tree or plant, or as a drench in the soil around it. These compositions can be prepared with a single metal chelate complex dispersed in the solid or liquid vehicle, for use to treat plants suffering from a deficiency of but one trace metal, such as iron chlorosis. However, they can also be prepared with two or more metal chelate complexes so that a single composition can be used on a tree or the soil around it, when the tree is suffering from a deficiency of more than one trace metal. The proportions of the respective metal chelate complexes to one another in such composition can be determined from the content of the respective metals in the soil about the plant and the indicated extent of the deficiency of them in the plant. So also, the proportion of metal chelate complex in the composition depends on the nature of the vehicle and the amount of it ordinarily used per plant if the vehicle is one used to supply other materials to the plant, such as nutrients when the vehicle is a fertilizer.

These compositions of the invention are illustrated by, but not restricted to, the following examples:

*Example 7.—Solid composition (complex intermixed with a solid vehicle):* (a) *Fertilizer vehicle.*—One or more of the specific metal chelate complexes of this dihydroxyethyl dicarboxymethyl ethylenediamine (with any of the plant trace metals) is intermixed relatively uniformly with any of the usual fertilizers commonly used for the particular tree or plant to be treated, and in such relative proportions that the amount of fertilizer ordinarily used per average tree will be accomplished by an adequate amount of the chelate complex constituent to furnish the indicated necessary amount of the trace metal or metals in which the plant is deficient. Thus, with a fertilizer used to the extent of about fifty pounds per mature tree, from about one-tenth to one pound of, for example, the ferric ion chelate complex of this dihydroxyethyl dicarboxymethyl ethylenediamine, as for Example 6(a), can be intermixed with fifty pounds of the selected fertilizer. This permits furnishing about one-third pound of that chelate complex per tree by use of the required amount of the composition containing the fertilizer, indicated by the content of the complex in the composition.

(b) *Inert vehicle, e. g., sand.*—About one to four pounds of the ferric iron chelate complex of part (a) of this example is intermixed with sand to make a total of fifty pounds of mixture. This mixture can be used per tree in an amount to furnish, for example, one-third pound of that chelate complex per tree. The mixture can be spread over the soil around the tree, or worked into the soil. The proportions of complex to sand can be suitably varied.

*Example 8—Liquid composition.*—A solution prepared with from about 100 to about 200 parts of the ferric iron complex of Example 6(a) per million parts of water can be used as a spray to apply about one-third pound of the chelate complex per full grown citrus tree. Alternatively, the same or suitably more concentrated aqueous solution of this chelate complex can be used as a drench to be applied to the soil about the tree in an amount that could provide the equivalent treatment.

In any of the foregoing Examples, 7 and 8, the specific chelate complex can be replaced, or accompanied, by a suitable amount of one or more of the chelate complexes of N,N-dihydroxyethyl N',N'-dicarboxymethyl ethylenediamine with other of the trace metals commonly found in trees and plants. Such replacement or addition can be with the particular chelate complex in a proportion such that the amount administered of the resulting composition is sufficient to furnish an adequate dosage of the particular trace metal or metals to overcome the indicated deficiency.

While the invention has been described in relation to various specific embodiments of it, it is understood that many substitutions and other modifications can be made in it within the scope of the several appending claims that are intended also to cover equivalents as well.

I claim:

1. A member of the class consisting of N,N-dihydroxyethyl N',N'-dicarboxymethyl ethylenediamine, its water-soluble salts with monovalent cations, and its water-soluble chelate complexes with divalent and higher than divalent metals.

2. N,N-dihydroxyethyl N',N'-dicarboxymethyl ethylenediamine.

3. A water-soluble metal chelate complex of N,N-dihydroxyethyl N',N'-dicarboxymethyl ethylenediamine.

4. A water-soluble metal chelate complex of N,N-dihydroxyethyl N',N'-dicarboxymethyl ethylenediamine, wherein the metal is divalent.

5. A water-soluble metal chelate complex of N,N-dihydroxyethyl N',N'-dicarboxymethyl ethylenediamine, wherein the metal is higher than divalent.

6. A water-soluble metal chelate complex of N,N-dihydroxyethyl N',N'-dicarboxymethyl ethylenediamine, wherein the metal is one of the iron group of metals.

7. A water-soluble metal chelate complex of N,N-dihydroxyethyl N',N'-dicarboxymethyl ethylenediamine, wherein the metal is iron.

8. The ferric chelate of N,N-dihydroxyethyl N',N'-dicarboxymethyl ethylenediamine.

9. A water-soluble alkaline earth metal chelate complex of N,N-dihydroxyethyl N',N'-dicarboxymethyl ethylenediamine.

10. The barium chelate complex of N,N-dihydroxyethyl N',N'-dicarboxymethyl ethylenediamine.

11. A water-soluble salt of N,N-dihydroxyethyl N',N'-dicarboxymethyl ethylenediamine with a monovalent cation.

12. The ammonium salt of N,N-dihydroxyethyl N',N'-dicarboxymethyl ethylenediamine.

13. The sodium salt of N,N-dihydroxyethyl N',N'-dicarboxymethyl ethylenediamine.

14. A composition effective in treating diseases in plants and trees caused by a deficiency of the trace metal iron in them, which comprises the iron chelate complex of N,N-dihydroxyethyl N',N'-dicarboxymethyl ethylenediamine and a vehicle for it harmless to the plant and tree.

References Cited in the file of this patent

UNITED STATES PATENTS

| | | |
|---|---|---|
| 2,129,598 | Zimmerman | Sept. 6, 1938 |
| 2,248,400 | Avery | July 8, 1941 |
| 2,407,645 | Bersworth | Sept. 17, 1946 |
| 2,413,856 | Bersworth | Jan. 7, 1947 |
| 2,428,353 | Bersworth | Oct. 7, 1947 |
| 2,493,654 | Calvin | Jan. 1, 1950 |
| 2,526,557 | Gresham et al. | Oct. 17, 1950 |
| 2,673,213 | Bersworth | Mar. 23, 1954 |
| 2,673,214 | Bersworth et al. | Mar. 23, 1954 |

OTHER REFERENCES

Harvey et al.: Jour. Amer. Chem. Soc., vol. 71, pp. 3641–3643, November 1949.

"Plant Physiology," April 1951, pp. 411 to 413.

Chaberek et al. Jour. Amer. Chem. Soc., vol. 74, pp. 5057–5060, October 20, 1952 (rec'd April 24, 1952).

UNITED STATES PATENT OFFICE
CERTIFICATE OF CORRECTION

Patent No. 2,859,104

November 4, 1958

Harry Kroll

It is hereby certified that error appears in the printed specification of the above numbered patent requiring correction and that the said Letters Patent should read as corrected below.

Column 4, line 14, for "Darco S-61" read -- Darco S-51 --; column 5, line 64, for "accomplished" read -- accompanied --.

Signed and sealed this 10th day of March 1959.

(SEAL)
Attest:

KARL H. AXLINE
Attesting Officer

ROBERT C. WATSON
Commissioner of Patents